United States Patent [19]

Tanaka

[11] 4,398,136

[45] Aug. 9, 1983

[54] CONTROLLER FOR AUTOMATIC TOOL CHANGER

[75] Inventor: Hiroaki Tanaka, Hamamatsu, Japan

[73] Assignee: Enshu Limited, Japan

[21] Appl. No.: 333,377

[22] Filed: Dec. 22, 1981

[51] Int. Cl.³ .................................................. G05B 13/00
[52] U.S. Cl. ..................................... 318/561; 318/467; 29/568; 408/8
[58] Field of Search ............... 318/561, 563, 565, 603, 318/626, 467; 29/568; 408/8, 13; 364/474

[56] References Cited

U.S. PATENT DOCUMENTS

| | | | |
|---|---|---|---|
| 3,517,286 | 6/1970 | Stobbe | 318/603 X |
| 3,733,961 | 5/1973 | Reynolds | 318/467 X |
| 3,775,837 | 12/1973 | Tomita et al. | 29/568 |
| 4,195,250 | 3/1980 | Yamamoto | 318/626 XP |
| 4,214,191 | 7/1980 | Watanabe et al. | 318/572 XP |
| 4,300,278 | 11/1981 | Nomura et al. | 29/568 |
| 4,366,423 | 12/1982 | Inaba et al. | 318/563 |

Primary Examiner—B. Dobeck
Attorney, Agent, or Firm—Lerner, David, Littenberg, Krumholz & Mentlik

[57] ABSTRACT

On a work machine such as a milling machine having a main spindle for chucking a tool and a mobile transfer arm assembly for replacing the tool under control by a numerical control device, a chucking repeat controller including a chucking repeat fixer, which is given in the form of either a counter or a time-limit timer, automatically repeats chucking operation by the main spindle upon detection of any failure in chucking operation, and intercepts all further operation of the main spindle and the transfer arm assembly for maintenance purposes when failure in the chucking operation has been repeated in succession for prescribed number of times, preferably with concurrent generation of some visible and/or audible alarm for operators' attention.

4 Claims, 14 Drawing Figures

CONTROLLER FOR AUTOMATIC TOOL CHANGER

BACKGROUND OF THE INVENTION

The present invention relates to a chucking repeat controller for a work machine with ATC., and more particularly relates to an apparatus capable of repeating chucking operation for prescribed times upon detection of unsuccessful chucking operation at a main spindle on a work machine such as a milling machine on which a tool holder on the main spindle is automatically replaced with a different and/or new tool holder standing by in a tool magazine by operation of a tool transfer arm assembly under control of a numerical control device.

On a work machine of the above-described type, the main spindle is internally provided with a drawing bolt which is driven, by a drive motor connected thereto, for normal and reverse rotation in order to fasten or release a tool holder. In combination with this chucking operation at the main spindle, the tool transfer arm assembly carries out horizontal turning and vertical reciprocal motions in order to remove a tool holder from the main spindle back to the tool magazine and to feed a different and/or new tool holder from the magazine to the main spindle for replacement purposes.

It is well known that the chucking operation at the main spindle occasionally ends in failure due to unexpected ill screw engagement between the drawing bolt in the main spindle and the tool holder carried by the tool transfer arm assembly. Such failure in chucking operation causes falling of the new tool holder whilst disenabling the further continuous operation of the work machine.

In order to avoid such unsuccessful chucking operation, it is proposed to raise accuracy in construction relating to the screw engagement between the drawing bolt and the tool holder. Such a proposal, however, cannot assure completely trouble-free chucking operation.

As long as no complete elimination of unsuccessful chucking operation is expectable, it is desirable as a second measure, that the result of chucking operation should be automatically detected and, upon detection of any unsuccessful chucking operation, same chucking operation should automatically repeated. Further, too much repeated failure in chucking operation is believed to indicate occurance of some fatal trouble in operation of the work machine in particular in the function of the main spindle including the drawing bolt and such a situation doubtlessly requires overall checking and maintenance of the work machine. From this point of view, it is also desirable that, when failure in chucking operation repeats in succession over a prescribed times, further operation of the work machine should automatically intercepted and, more fabourably, some audible and/or visible alarm should automatically generated for operators' attention.

SUMMARY OF THE INVENTION

It is one object of the present invention to provide a chucking repeat controller which is able to detect failure in chucking operation on a work machine and automatically repeat same chucking operation in case of unsuccessful chucking operation.

It is another object of the present invention to provide a chucking repeat controller which is able to automatically intercept further operation of a work machine when failure in chucking operation repeats in succession over a prescribed times.

In accordance with the basic aspect of the present invention, the chucking repeat controller includes means for generating a chucking start signal upon detection of the transfer arm assembly at a check point position below the main spindle of the work machine, and a motor control circuit coupled to the drive motor for the drawing bolt in the main spindle and for generating a chucking complete signal upon detection of success in chucking operation. The chucking repeat controller further includes an arm control circuit coupled to the transfer arm assembly in order to control movement of the transfer arm assembly between the main spindle and the check point position, and a chucking repeat circuit which forms the heart of the controller and coupled to the numerical control device of the work machine, the chucking start signal generating means arranged at the check point position, the motor control circuit and the arm control circuit.

The chucking repeat circuit cleans up its chucking repeat mode and the motor control circuit stops rotation of the drive motor for the drawing bolt upon receipt of the chucking complete signal which is concurrently passed to the numerical control device as a work continuation order to enable subsequent operation of the transfer arm assembly.

When no chucking complete signal is received within a prescribed set time after receipt of each chucking start signal, the chucking repeat circuit generates a reverse rotation order for the motor control circuit and a descent order for the arm control circuit.

The chucking repeat circuit further generates, when the chucking complete signal hasn't been received for prescribed times in succession, a stop order for the motor control circuit and a work stop order for the numerical control device.

DESCRIPTION OF THE PREFERRED EMBODIMENTS

Figure 1:
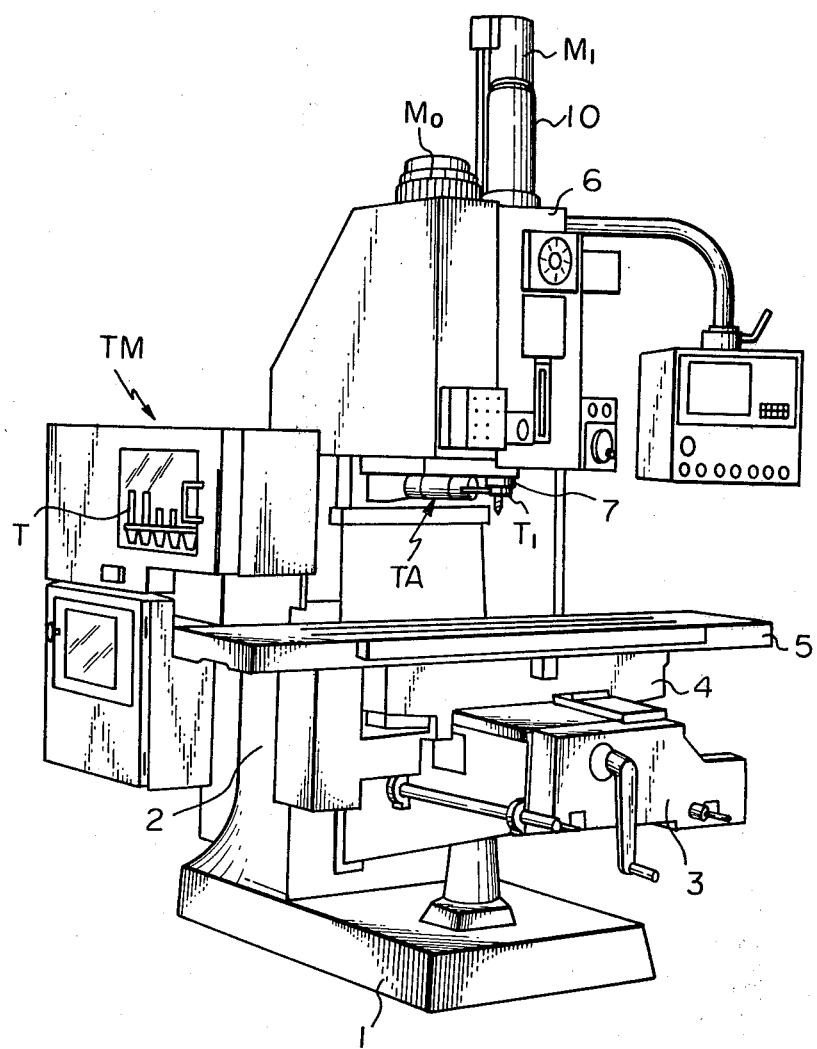
FIG. 1 is overall perspective view of a milling machine with ATC. to which the chucking repeat controller in accordance with the present invention is attached.

One typical example of the work machine to which the present invention is advantageously applied is shown in FIG. 1, in which the work machine is given in the form of a milling machine F including, as the major parts, a pedestal 1, a column 2 mounted vertically to the pedestal 1, a knee 3 coupled to the column 2, a saddle 4 movable along a given guide, a work table 5 arranged atop the saddle 4, a spindle head 6 arranged over the work table 5, a main spindle 7 held by the spindle head 6 and a main drive motor $M_o$ for the main spindle 7.

Figure 2:
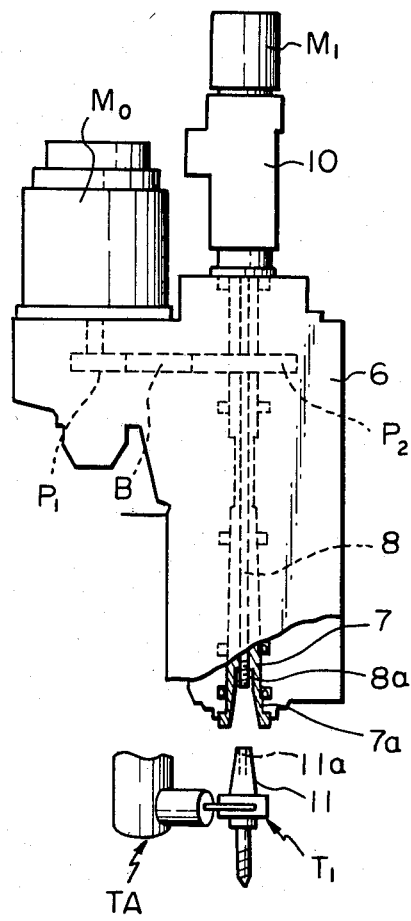
FIG. 2 is a side view, partly in section, of the spindle head with the main spindle on the work machine shown in FIG. 1, FIGS. 3 and 4 are side views, partly in section, for showing chucking operation at the main spindle shown in FIG. 2.

The drive motor $M_o$ is of a type able to change its output rotation speed steplessly and its connection to the main spindle 7 is shown with dot lines in FIG. 2. More specifically, a drive pulley $P_1$ fixed to the output shaft of the drive motor $M_o$ is operationally coupled to a driven pulley $P_2$ fixed to the main spindle 7 by means of a belt B. As a consequence, the main spindle 7 is driven for rotation at steplessly variable speeds.

The milling machine F is further provided with a tool magazine TM for reserving a number of tool holders T. A tool transfer arm assembly TA is arranged near the main spindle 7 on the spindle head 6 in order to replace a tool holder $T_1$ clampled by the main spindle 7 with any one tool holder T reserved in the tool magazine TM. A tool clamper assembly 10 is mounted atop the spindle head 6 and, as shown in FIG. 2, coupled to the top end of a drawing bolt 8 which is inserted vertically in the spindle head 6. Depending on rotation of a drawing bolt driving motor $M_1$ attached to the tool clamper assembly 10, the tool clamper assembly 10 rotates the drawing bolt 8 in one of two opposite directions in order to clamp or unclampe the tool holder $T_1$ with respect to a conical recess 7a of the main spindle 7.

Figure 3:
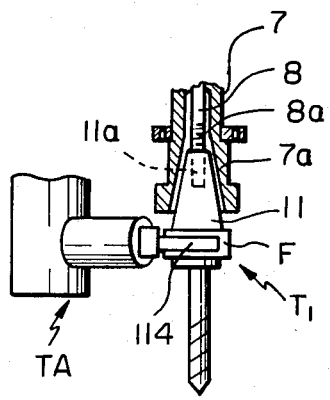
Figure 4:
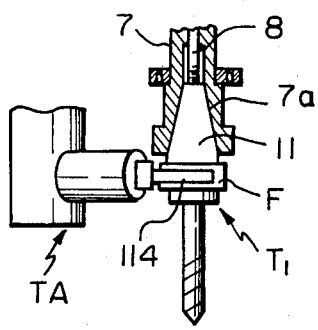

More specifically, as the tool transfer arm assembly TA moves upwards, a point screw 8a of the drawing bolt 8 appearing in the above-described conical recess 7a is brought into contact with a screw 11a formed on the point of a shank 11 of the tool holder $T_1$ held by the tool transfer arm assembly TA as shown in FIG. 3. By following rotation of the drawing bolt drive motor $M_1$, the drawing bolt 8 is rotated in the same direction so that the screws 8a and 11a are brought into screw engagement, and the shank 11 of the tool holder $T_1$ is clamped in the conical recess 7a of the main spindle 7 as shown in FIG. 4. When the screw 8a on the drawing bolt 8 continues its rotation over a prescribed length of period without successful screw engagement with the screw 11a on the tool holder $T_1$, however, rotation of the drawing bolt 8 ceases in the situation shown in FIG. 3. As a consequence, subsequent release of the hold on the tool holder $T_1$ by the tool transfer arm assembly TA naturally causes falling of the tool holder $T_1$ on the work table 5.

Figure 5:
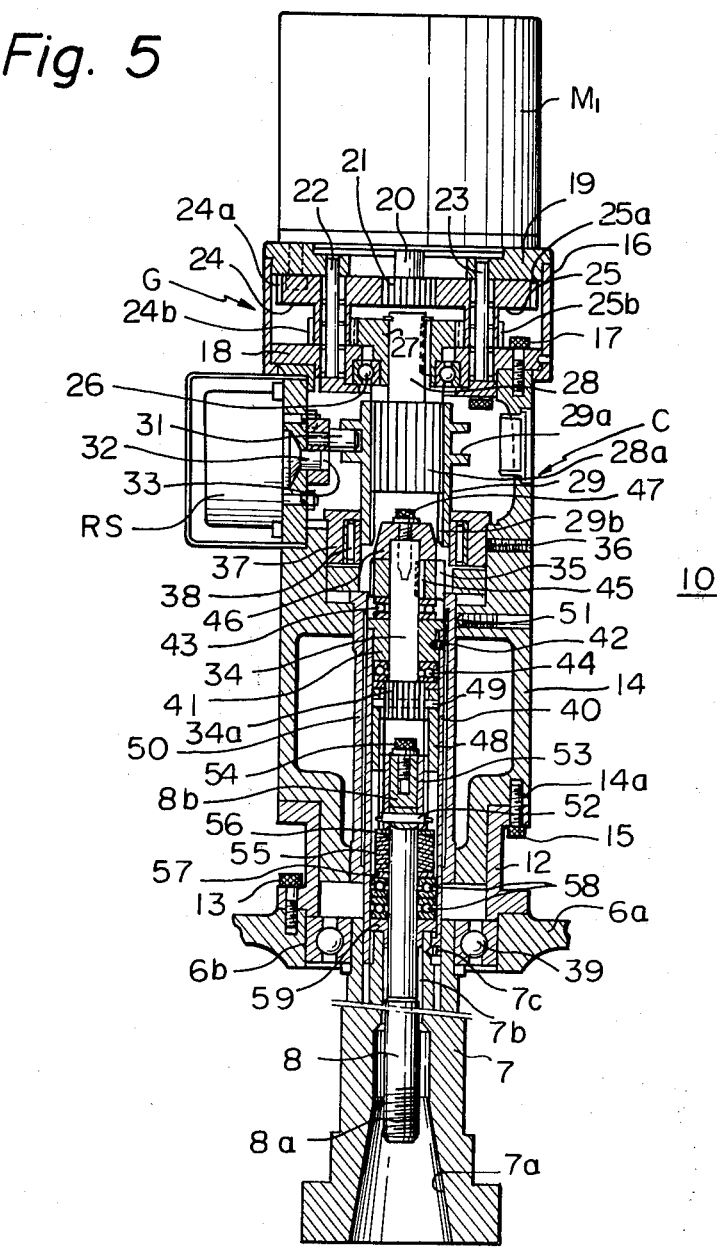
FIG. 5 is a side sectional view of the tool clamper assembly arranged on the work machine shown in FIG. 1.

One example of the construction of the tool clamper assembly 10 is illustrated in FIG. 5. The tool clamper assembly 10 is coupled, via a connecting sleeve 12, to a top wall 6a of the spindle head 6 by means of set screws 13. The lower end of a vertically elongated cylindrical casing 14 is inserted into the upper section of the connecting sleeve 12 and its lower annular step 14a is fixed to the upper and flange of the connecting sleeve 12 by means of set screws 15. A cylindrical casing 16 for containing a reduction gear mechanism G is coupled atop the lower cylindrical casing 14 whilst embracing a bearing flange 18 which is fixed to the top end of the lower cylindrical casing 14 by means of set screws 17. The top end of the upper cylindrical casing 16 is closed by another bearing flange 19 on which the drawing bolt drive motor $M_1$ is arranged.

The reduction gear mechanism G arranged within the upper cylindrical casing 16 includes a pinion gear 21 secured to the output shaft 20 of the drawing bolt drive motor $M_1$. A pair of shafts 22 and 23 are supported by the upper and lower bearing flanges 18 and 19 in parallel to the output shaft 20 of the drive motor $M_1$. These shafts 22 and 23 rotatably carry intermediate gears 24 and 25 by means of needle bearings, respectively, in such an arrangement that larger gear sections 24a and 25a of the intermediate gears 24 and 25 are placed in meshing engagement with the pinion gear 21. Further, smaller gear sections 24b and 25b of the intermediate gears 24 and 25 are placed in meshing engagement with a driven gear 27 rotatably held by the lower bearing flange 18 by means of a bearing 26. Thus, due to presence of the reduction gear mechanism G, the high speed rotation of the output shaft 20 of the drive motor $M_1$ is reduced to the rotation of the driven gear 27 at a low speed in a range from 200 to 300 RPM. An output shaft 28 is keyed to the driven gear 27 in line with the output shaft 20 of the drive motor $M_1$ and terminates, within the lower cylindrical casing 14, in a spline shaft 28a.

A clutch mechanism C is arranged in the top end section of the lower cylindrical casing 14 in order to control the connection between the reduction gear mechanism G and the drawing bolt 8. The clutch mechanism G includes a connecting cylinder 29 fixedly inserted over the spline shaft 28a on the output shaft 28 of the reduction gear mechanism G. This connecting cylinder 29 is provided on its outer surface with a double flange 29a which engages with an eccentric pin 31. About the level of the connecting cylinder 29, an electromagnetic rotary solenoid RS is mounted to the outer surface of the lower cylindrical casing 14 with its output shaft 32 extending radially into the interior of the cylindrical casing 14. This output shaft 32 fixedly carries a radical arm 33 which holds at its distal end the above-described eccentric pin 31.

When the rotary solenoid RS is out of operation, the radial arm 33 is directed upwards as shown in the drawing in order to lift the connecting cylinder 29 and, at this lifted position, the lower end section of an inner spline 29b of the connecting cylinder 29 is placed out of engagement with an annular spline 35 on a transmitter shaft 34 on the side of the drawing bolt 8. As the rotary solenoid RS is brought into operation, the radial arm 33 is directed downwards in order to lower the connecting cylinder 29 and, at this lowered position, the lower end section of the inner spline 29b of the connecting cylinder 29 resumes the engagement with the annular spline 35 on the transmitter shaft 34.

The lower end section of the connecting cylinder 29 is slidably supported, via a needle bearing 38, by an annular body 37 fixed to the inner wall of the lower cylindrical casing 14 by means of a set screw 36.

The drawing bolt 8 inserted in a through hole 7b of the main spindle 7 is coupled to the tool clamper assembly 10 in the following manner. A bearing 39 is inserted in a through hole 6b formed in the top wall 6a of the spindle head 6 and supports the top end 7b of the main spindle 7. The lower end of an upwardly elongated center cylinder 40 is threaded into the top end 7b of the main spindle 7 and the center cylinder 40 terminates about the middle of the length of the lower cylindrical casing 14. The top end of the center cylinder 40 is closed by a bearing sleeve 41 via screw engagement and a set screw 42, which holds the body of the transmitter shaft 34. The bearing sleeve 41 is accompanied on both longitudinal ends with a pair of thrust bearings 43 and 44. On the upper side of the upper bearing 43, the annular spline 35 is coupled to the transmitter shaft 34 by means of a key 45. A seat 46 coupled to the top end of the transmitter shaft 34 is fastened by a fastening screw 47 in order to hold the annular spline 35, the upper bearing 43, the bearing sleep 41 and the lower bearing 44 together in cooperation with a lower spline 34a of the transmitter shaft 34. In this way, the transmitter shaft 34 is rotatably held by the center cylinder 40 via the bearing sleeve 41. As the connecting cylinder 29 of the clutch mechanism C lowers, the inner spline 29b on the connecting cylinder 29 is brought into the engagement with the annular spline 35 on the transmitter shaft 34 which in turn receives reduced rotation from the drawing bolt drive motor $M_1$ within the center cylinder 40.

An outer bearing cylinder 50 is coaxially coupled to the lower cylindrical casing 14 by means of a set screw 51 whilst internally holding the center cylinder 40 and the annular spline 35. Another annular spline 48 is inserted in the center cylinder 40 and fixed to the lower spline 34a of the transmitter shaft 34 by means of a set screw 49. This annular spline 48 is kept in engagement with a further annular spline 53 which is fixed, by means of a pin 52, to a top end piece 8b of the drawing bolt 8. With the abovedescribed construction, the drawing bolt 8 is always operationally coupled to the transmitter shaft 34 and is allowed to lift until a screw 54 coupled to its top end abuts the bottom of the lower spline 34a of the transmitter shaft 34.

Washer springs 55 are arranged on the lower side of the annular spline 53 whilst surrounding the drawing bolt 8 and sandwiched by a pair of spring seats 56 and 57. A pair of thrust bearings 58 and a seat metal 59 are interposed between the lower spring seat 57 and the top end of the main spindle 7. As the drawing bolt 8 borne by the washer springs 55 is driven for rotation in one direction by the drive motor $M_1$, its point screw 8a comes into screw engagement with the screw 11a in the tool holder $T_1$. When the drawing bolt 8 is driven for rotation in the reverse direction, its point screw 8a is released from the screw engagement with the screw 11a in the tool holder $T_1$ in order to free the latter.

Figure 6:
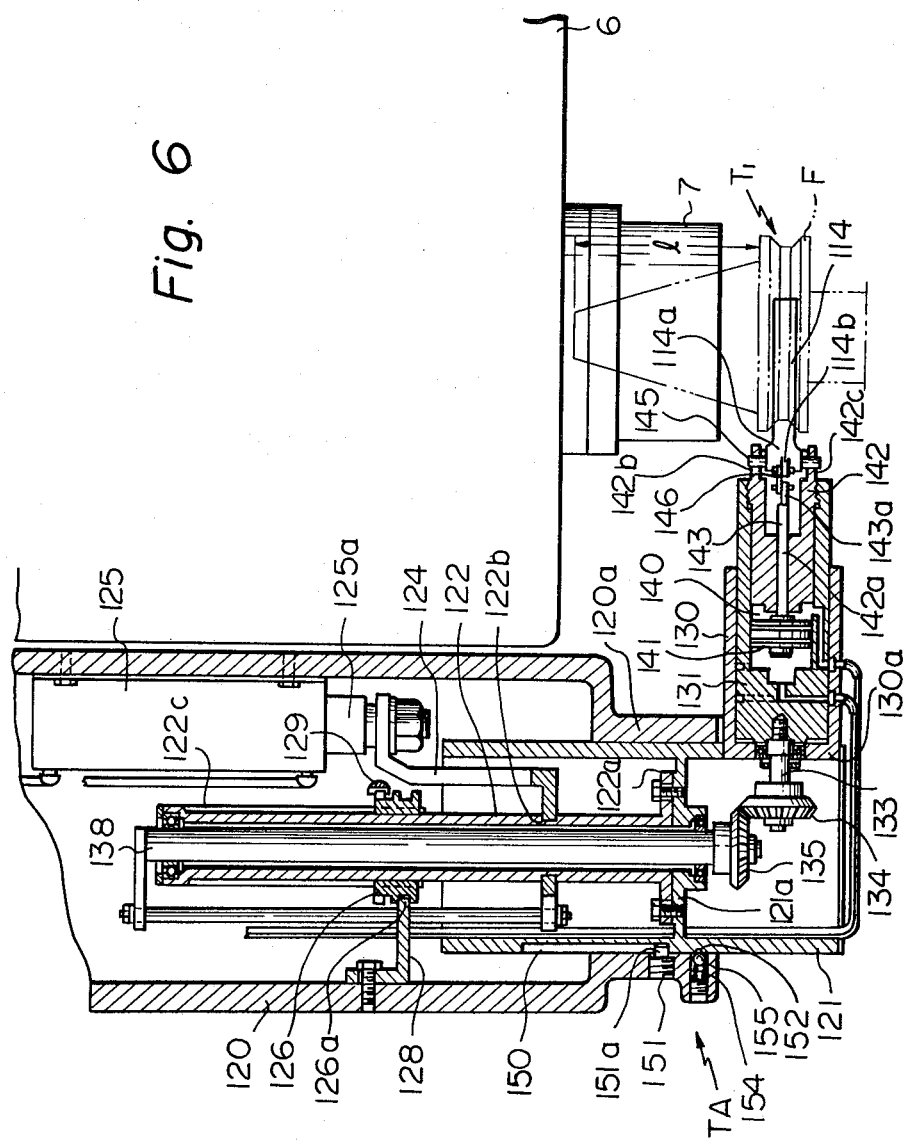
FIG. 6 is a side sectional view of the tool transfer arm assembly arranged on the work machine shown in FIG. 1.
Figure 7:
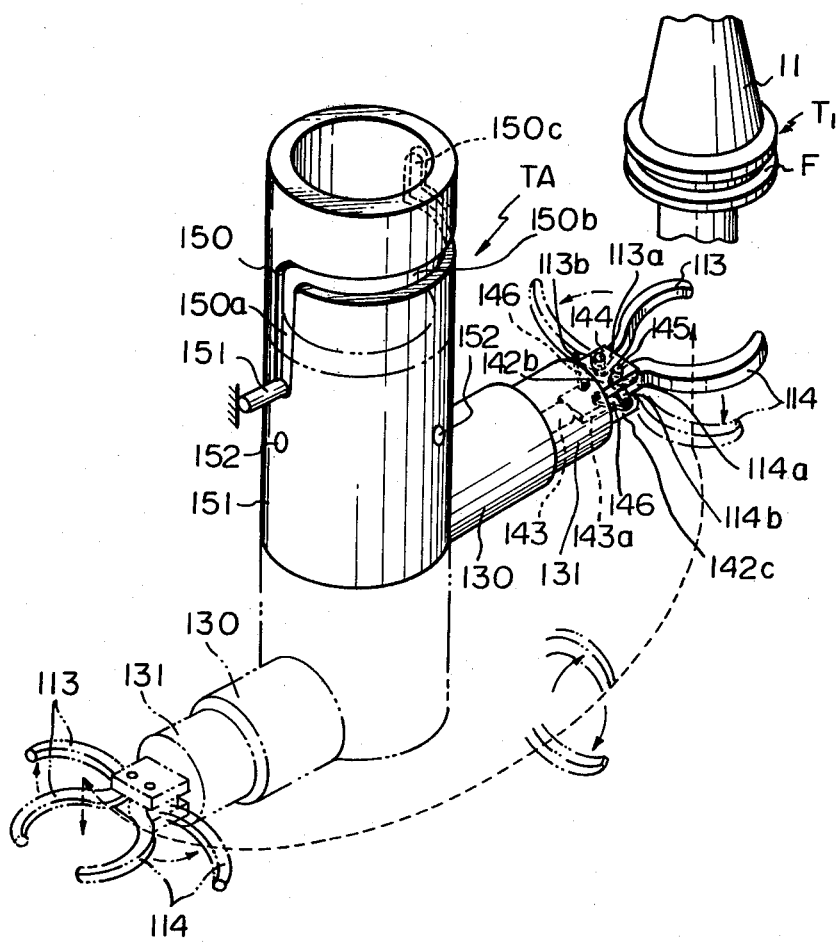
FIG. 7 is a perspective view of the tool transfer arm assembly shown in FIG. 6.

The construction of the tool transfer arm assembly TA is shown in FIGS. 6 and 7. In FIG. 6, an upright outer cylinder 121 acts as the center of turning of the tool transfer arm assembly TA and is coupled at its body to the bottom bearing section 120a of an upright housing 120 in an axially turnable and vertically slidable arrangement. An upright inner cylinder 122 is coaxially arranged within the outer cylinder 121 with its bottom flange 122a being fixed to an inner flange 121a of the outer cylinder 121. An operation lever 124 is idly coupled in its horizontal section to a circumferential groove 122b of the inner cylinder 122. One vertical section of this operation lever 124 is coupled to the piston rod 125a of an air cylinder 125 vertically mounted to the inner wall of the hosing 120. Thus, operation of the air cylinder 125 causes, via the operation lever 124, corresponding vertical movement of the inner and outer cylinders 122 and 121 relative to the housing 120 whilst allowing their free axial turning. A pinion 126 is arranged in meshing engagement with a spline 122c formed in the outer surface of the inner cylinder 122, and driven for rotation by a rack 129 which is operationally coupled to another air cylinder (not shown). A holder arm 128 fixed to the inner wall of the housing 120 is idly coupled at its distal end to a circumferential groove 126a of the pinion 126 in order to keep the pinion 126 at a prescribed level whilst allowing free rotation of the pinion 126. Operation of the abovedescribed another air cylinder causes, via reciprocation of the rack 129, corresponding axial turning of the inner and outer cylinders 122 and 121.

A holding cylinder 130 is arranged near the bottom end of the housing 120 whilst radially extending from the bottom end section of the outer cylinder 121. About half of a cylindrical block 131 is inserted in the holding cylinder 130 and a support shaft 133 rotatably extending through the end wall 130a of the holding cylinder 130 is placed in screw engagement with the proximal end of the cylindrical block 131. Within the bottom end section of the outer cylinder 121, a bevel gear 134 is fixed to the distal end of the support shaft 133 in meshing engagement with another bevel gear 135 secured to the bottom end of a vertical shaft 138 which extends through and rotatably held by the inner cylinder 122. This vertical shaft 138 is operationally coupled to the operation lever 124. With this construction, the outer cylinder 121 is driven for axial turning by reciprocation of the rack 129 but the bevel gear 135 on the vertical shaft 138 remains standstill as the inner cylinder 122 and the vertical shaft 138 are coupled to each other for free relative rotation. As the outer cylinder 121 turns axially, the bevel gear 134 on the support shaft 134 is driven for rotation while travelling circularly on the bevel gear 135. This rotation of the bevel gear 134 causes concurrent rotation of the cylindrical block 131 about the axis of the housing cylinder 130 which is driven for rotation about the axis of the outer cylinder 121. As a consequence, the cylindrical block 131 rotates about the axis of the housing cylinder 130 while concurrently rotating about the axis of the outer cylinder 121.

The cylindrical block 131 internally defines a piston chamber 140 which accommodates a piston head 141. The outer end of the piston chamber 140 is closed by an end closure 142 having an axial through hole 142a. A piston rod 143 extends outwards from the piston head 141 through the hole 142a of the end closure 143 and a pair of connecting arms 146 are pivoted to the flat distal end 143a of the piston rod 143. A pair of arcuate holder jaws 113 and 114 are pivoted at their proximal ends 113a and 114a to vertical pins 144 and 145 spanning a pair of horizontal tongues 142b and 142c projecting from the outer end of the closure 142. Curved tail extensions 113b and 114b of the holder jaws 113 and 114 are pivoted to the above-described connecting arms 146 so that the holder jaws 113 and 114 should be operationally linked to the piston rod 143.

When the piston head 141 is located close to the outer end of the stroke in the piston chamber 140, the pair of holder jaws 113 and 141 close as shown with solid lines in FIG. 7 in order to clamp and hold the flange FR of the tool holder $T_1$. As the piston head 141 moves towards the inner end of the stroke in the piston chamber 140, the pair of holder jaws 113 and 114 open as shown with chain lines in FIG. 7 in order to release the tool holder $T_1$.

Adjustments of the timings for the vertical and horizontal movements of the tool transfer arm assembly TA and for the position shifting of the holder jaws 113 and 114 are carried out in the following manner. At a position above the housing cylinder 130, a cam slot 150 formed in the wall of the outer cylinder 121 in engagement with a pin 151 extending from the inner wall of the housing 120 as shown in FIG. 7. The cam slot 150 controls vertical and horizontal movements of the outer cylinder 121 and consists of circumferential horizontal section 150b extending over 180° center angle, the first vertical section 150a extending downwards from the one end of the horizontal section 150b, and the second vertical section 150c extending upwards from the other end of the horizontal section 150b.

Movement of the outer cylinder 121 is controlled by engagement of this cam slot 150 with the pin 151 on the housing 120 while being driven for such movement by the air cylinder 125 and the rack 129. That is, when the pin 151 is located at the bottom end of the first vertical section 150a of the cam slot 150, the tool transfer arm assembly TA is located close to the main spindle 7 and the holder jaws 113 and 114 are located at an upper position facing a tool holder $T_1$ held by the main spindle 7. This is the stand-by position for the tool transfer arm assembly TA. Closing of the holder jaws 113 and 114 gives hold to the flange FR of the tool holder $T_1$. Being driven by the air cylinder 125, the outer cylinder 121 moves downward and the top end of the first vertical section 150a of the cam slot 150 approaches the pin 151. As a consequence, the tool transfer arm assembly TA moves downwards over a distance equal to the length of the first vertical section 150a of the cam slot 150 and the tool holder $T_1$ is disengaged from the main spindle 7. Here, the length of the first vertical section 150a of the cam slot 150 is somewhat larger than that of the tapered section of the tool holder T.

The movement the pin 151 is located at the top end of the first vertical section 150a of the cam slot 150, the outer cylinder 121 is driven for axial turning by the rack 129 over 180° center angle and the pin 151 travels along the horizontal section 150b towards the bottom end of the second vertical section 150c of the cam slot 150. Upon this axial turning of the outer cylinder 121, the cylindrical block 131 is driven for rotation about the axis of the housing cylinder 130 over 180° center angle due to engagement of the bevel gears 134 and 135 and the holder jaws 113 and 114 are turned upside down as shown with arrows in FIG. 7.

As the pin 151 is registered at the bottom end of the second vertical section 150c, the outer cylinder 121 restarts to move downards and the pin 151 travels along the second vertical section 150c of the cam slot 150 towards the top end. As a consequence, the tool transfer arm assembly TA with the tool holder $T_1$ disengaged from the main spindle 7 descends towards an empty socket on the tool magazine TM over a distance equal to the length of the second vertical section 150c of the cam slot 150. Subsequent opening of the holder jaws 113 and 114 lets the tool holder $T_1$ drop in the empty socket due to its weight.

By reversing the drive by the air cylinder 125 and the rack 129, the tool transfer arm assembly TA is able to operate on the reverse under control by the cam slot 150. The tool transfer arm assembly TA ceases its movement at the stand-by position facing the main spindle 7. So that the tool transfer arm assembly TA can be kept at this stand-by position even when the air cylinder 125 is disenergized unexpedtedly, a number of recesses 152 are formed in the outer surface of the outer cylinder 121 each of which receives a latching ball 155 pressed by a compression spring 154 held in the housing 120 as shown in FIG. 6.

As briefly described already, it is the prime object of the present invention to automatically repeat chucking operation of a tool holder to the main spindle in case of an unsuccessful chucking on a work machine equipped with the automatic tool constroller of the above-described type.

Figure 8:
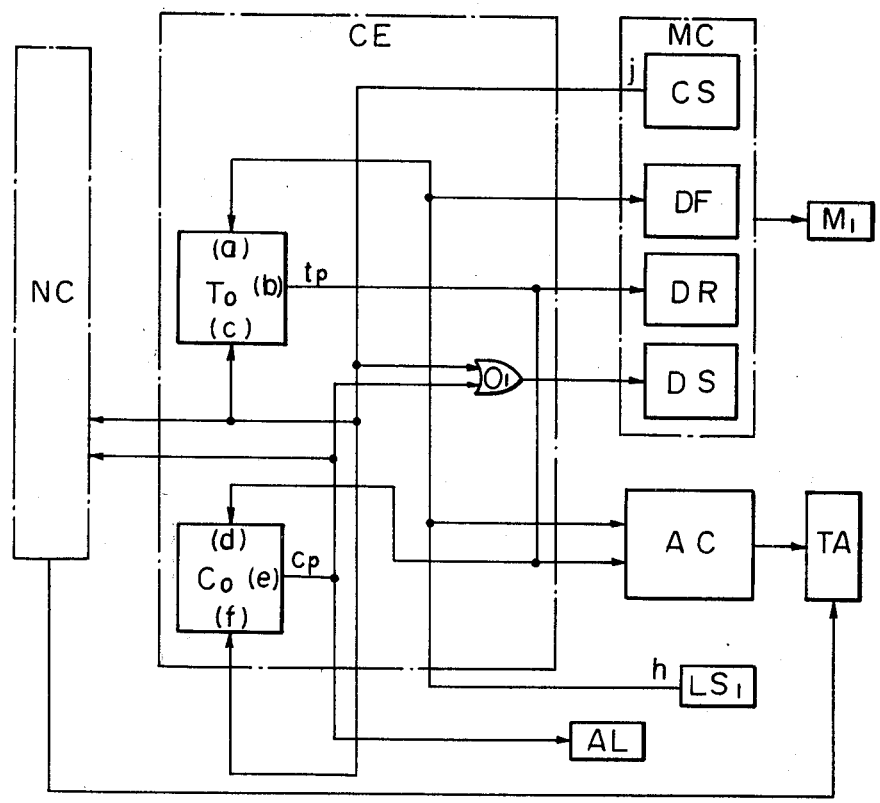
FIG. 8 is a block diagram for showing the construction of one embodiment of the chucking repeat controller in accordance with the basic concept of the present invention.

One embodiment of the chucking repeat controller for carrying out the above-described operation is shown in FIG. 8, in which a chucking repeat circuit CE forms the heart of the chucking controller, and includes a timer $T_o$, a counter $C_o$ and an OR-gate $O_1$. These elements are electrically connected to a numerical control device NC, a drawing bolt drive motor control circuit MC (hereinafter referred to as "motor control circuit"), a tool transfer arm assembly control circuit AC (hereinafter referred to as "arm control circuit") and a limit switch $LS_1$ in order to provide the presecribed chucking repeat function on the basis of their interaction.

The motor control circuit MC includes a current sensor CS which generates a chucking complete signal "j" upon detection of success in chucking operation. When the current through the drive motor $M_1$ falls short of its normal value after the prescribed time delay (for example 5 sec.) at the timer $T_o$, the current sensor CS generates the above-described chucking complete signal "j". The motor control circuit MC further includes a normal rotation relay DF to initiate the normal rotation of the drive motor $M_1$, a reverse rotation relay DR to initiate the reverse rotation of the drive motor $M_1$, and a rotation stopper DS to stop rotation of the drive motor $M_1$.

The limit switch $LS_1$ is arranged facing the junction of the horizontal section 150b with the first vertical section 150a of the cam slot 150 in order to detect presence of the transfer arm assembly TA right below the main spindle 7 (this point will hereinafter be referred to as a "check point") and generates a chucking start signal "h", which is a sort of chucking order.

The timer $T_o$ in the chucking repeat circuit CE includes an input terminal (a), a time-up terminal (b) and a reset terminal (c). When the chucking start signal "h" is received at the input terminal (a), the timer To generates, at its time-up terminal (b), a time-up signal "tp" after a prescribed set time, for example 5 sec. Whereas the timer $T_o$ generates no time-up signal despite receipt of the chucking start signal "h" when the chucking complete signal "j" from the current sensor CS is given to its reset terminal (c) within the prescribed set time.

The counter $C_o$ in the chucking repeat circuit CE includes an input terminal (d), a count-up terminal (e) and a reset terminal (f). The time-up signal "tp" is passed to the input terminal (d) of this counter $C_o$ which generates when such input is repeated for prescribed times, e.g. 3 times, a count-up signal "$C_p$". The counter $C_o$ is reset upon receipt of the chucking complete signal "j" from the current sensor CS in order to clear up the chucking repeat mode.

The aforementioned elements are electrically connected to each other as follows.

The output terminal of the current sensor CS is connected to the rotation stopper DS of the motor control circuit MC via the OR-gate $O_1$, to one input terminal of the numerical control device NC, and to the reset terminal (f) of the counter $C_o$.

The output terminal of the limit switch $LS_1$ is connected to one input terminal of the arm control circuit AC, to the normal rotation relay DF of the motor control circuit MC, and to the input terminal (a) of the timer $T_o$.

The count-up terminal (e) of the counter $C_o$ is connected to an alarm AL, to the rotation stopper DS of the motor control circuit MC via the OR-gate $O_1$, and to another input terminal of the numerical control device NC.

The time-up terminal (b) of the timer $T_o$ is connected to the reverse rotation relay DR, to the input terminal of the arm control circuit AC, and to the input terminal (d) of the counter $C_o$.

The operation of the aforementioned individual signal is as follows.

The time-up signal "tp" from the timer $T_o$ is passed to the reverse rotation relay DR of the motor control circuit MC in order to initiate reverse rotation of the drive motor $M_1$, to the arm control circuit AC in order to cause descent of the transfer arm assembly TA, and to the input terminal (d) of the counter $C_o$.

The count-up signal "Cp" from the counter $C_o$ is passed to the alarm AL in order to generate some audible and/or visible alarm, to the rotation stopper DS of the motor control circuit MC in order to intercept rotation of the drive motor $M_1$, and to the numerical control device NC as a work stop order in order to ban further operation of the transfer arm assembly TA.

The chucking complete signal "j" from the current sensor CS is passed, via the OR-gate $O_1$, to the rotation stopper DS of the motor control circuit MC in order to intercept rotation of the drive motor $M_1$, to the reset terminal (c) of the timer $T_o$ in order to clear up the chucking repeat mode, to the reset terminal (f) of the counter $C_o$ for resetting purposes, and to the numerical control device NC as a work continuation order.

The chucking start signal "h" from the limit switch $LS_1$ is passed, as an ascent order, to the arm control circuit AC in order to cause upward movement of the transfer arm assembly TA. The signal is further passed to the normal rotation relay DF of the motor control circuit MC in order to start normal rotation of the drive motor $M_1$, and to the input terminal (a) of the timer $T_o$.

When a chucking start signal "h" from the limit switch $LS_1$ is received and no chucking complete signal "j" from the current sensor CS is received within the prescribed set time, for example 5 sec., the timer $T_o$ generates at its time-up terminal (b) a time-up signal "tp".

The counter $C_o$ counts the time-up signal "tp" from the timer $T_o$. When no chucking complete signal "j" from the current sensor CS is received within the prescribed times of counting, for example 3 times, the counter $C_o$ generates at its count-up terminal (e) a count-up signal "Cp".

The motor control circuit MC initiates normal rotation of the drive motor $M_1$ upon receipt of the chucking start signal "h" from the limit switch $LS_1$ at its normal rotation relay DF, and reverse rotation of the drive motor $M_1$ upon receipt of the time-up signal "tp" from the time $T_o$ at its reverse rotation relay DF. The circuit MC further intercepts rotation of the drive motor $M_1$ upon receipt of either of the chucking complete signal "j" from the current sensor CS and the count-up signal "Cp" from the counter $C_o$ at its rotation stopper DS.

The arm control circuit AC initiates ascent of the transfer arm assembly TA upon receipt of the chucking start signal "h" from the limit switch $LS_1$, and decent of the assembly TA upon receipt of the time-up signal "tp" from the timer $T_o$.

The chucking repeat controller in accordance with the present invention as a whole operates as follows. It is assumed herein that the set time for the timer $T_o$ is 5 sec. and the counter $C_o$ has its output "Cp" after 3 times of receipt of the inputs.

As the transfer arm assembly TA has come to the check point, i.e. the position right below the main spindle 7 by its turning, the limit switch $LS_1$ detects the arrival and generates the chucking start signal "h". The chucking start signal "h" is passed to the arm control circuit AC as the ascent order and the transfer arm assembly TA ascends towards the main spindle 7. This chucking start signal "h" is also passed to the normal rotation relay DF of the motor control circuit MC and, after complete ascent of the transfer arm assembly TA, the drive motor $M_1$ is driven for normal rotation for the first chucking operation. The chucking start signal "h" is further passed to the input terminal (a) of the timer $T_o$.

(i) When the first chucking operation has ended in success (YES), a chucking complete signal "j" is generated by the current sensor CS within 5 sec., i.e. the set for the timer $T_o$. This chucking complete signal "j" is passed to the rotation stopper DS of the motor control circuit MC in order to stop the normal rotation of the drive motor $M_1$. Concurrently, the chucking complete signal "j" is passed to the reset terminal (c) of the timer $T_o$ in order to clear up the chucking repeat mode. As a consequence, despite input of the chucking start signal "h" from the limit switch $LS_1$, no time-up signal is generated by the timer $T_o$. This chucking complete signal "j" is also passed to the reset terminal (f) of the counter $C_o$ in order to clear up the chucking repeat mode. The chucking complete signal "j" is further passed, as a work continuation order, to the numerical control device NC so that the transfer arm assembly TA should carry out its further prescribed operations. That is, the transfer arm assembly TA continues its operation without any interception when the first chucking operation has ended in success.

(ii) When the first chucking operation has ended in failure, no chucking complete signal is generated by the current sensor CS within 5 sec., i.e. the set time for the timer $T_o$. As a consequence, a time-up signal "tp" is generated at the time-up terminal (b) of the timer $T_o$ 5 sec. after input of the chucking start signal "h" from the limit switch $LS_1$. This time-up signal "tp" is passed to the reverse rotation relay DR of the motor control circuit MC in order to initiate reverse rotation of the drive motor $M_1$, and to the arm control circuit AC as a descent order in order to cause downward movement of the transfer arm assembly TA. The time-up signal "tp" is also passed to the input terminal (d) of the counter $T_o$ which thereupon counts a value +1. As the transfer arm assembly TA descends to the check point by the limit switch $LS_1$, the arrival is detected by the limit switch LS$_1$ which thereupon again generates a chucking start signal "h". This chucking start signal "h" is passed to the arm control circuit AC as the ascent order so that the transfer arm assembly again moves upwards towards the main spindle 7. The chucking start signal "h" is also passed to the normal rotation relay DF of the motor control circuit MC so that the drive motor M$_1$ starts its normal rotation for the second chucking operation. The chucking start signal "h" is further passed to the input terminal (a) of the timer T$_o$.

(iii) When the second chucking operation has ended in success (YES), the current sensor CS generates a chucking complete signal "j" within 5 sec., i.e. the set time for the timer T$_o$. This chucking complete signal "j" is passed, as a stop order, to the rotation stopper DS in the motor control circuit MC in order to stop the normal rotation of the drive motor M$_1$. The chucking complete signal "j" is also passed to the reset terminal (c) of the timer T$_o$ and clears up the chucking repeat mode therein. Therefore, despite receipt of the chucking start signal "h" from the limit switch LS$_1$, no time-up signal is issued by the timer T$_o$. The chucking complete signal "j" is further passed to the reset terminal (f) of the counter C$_o$ for resetting purposes. The chucking complete signal "j" is further passed, as a work continuation order, to the numerical control device NC so that the transfer arm assembly TA should carry out prescribed subsequent operations. In the way described above, the transfer arm assembly TA continues its operation without any interception when the second chucking operation has ended in success.

(iv) When the second chucking operation was unsuccessful (N0), operation of the chucking controller corresponds to that after failure in the first chucking operation. That is, the timer T$_o$ generates a time-up signal "tp" which is then passed to the reverse rotation relay DR in order to initiate reverse rotation of the drive motor M$_1$. Concurrently, a descent order is passed to the arm control circuit AC and the transfer arm assembly TA moves downwards. The time-up signal "tp" is also passed to the counter C$_o$ which thereupon counts a value +2. As the transfer arm assembly TA resumes the check point position light below the main spindle 7, the limit switch LS$_1$ generates a chucking start signal "h", an ascent order is given to the arm control circuit AC, and the transfer arm assembly TA starts its upward movement. The chucking start signal "h" is also given to the normal rotation relay DF so that the drive motor M$_1$ initiates its normal rotation. The chucking start signal "h" is further passed to the timer T$_o$.

(v) When the third chucking operation has ended in success (YES), operation of the controller is just same as that after success in the second chucking operation. Namely, the current sensor CS generates a chucking complete signal "j" and a stop order is passed to the rotation stopper DS in order to cease the normal rotation of the drive motor M$_1$. The chucking complete signal "j" is also passed to the timer T$_o$ which thereupon generates no time-up signal, and further to the counter C$_o$ in order to clear up the chucking repeat mode therein. Concurrently, a work continuation order is passed to the numerical control device NC so that the transfer arm assembly TA continues its prescribed subsequent operations. In conclusion, the transfer arm assembly TA carries on its operation without any interception when the third chucking operation was successful.

(vi) When the third chucking operation was unsuccessful, the timer T$_o$ generates a time-up signal "tp", the reverse rotation relay DR receives this signal to initiate reverse rotation of the drive motor M$_1$, and a descent order is passed to the arm control circuit AC to drive the transfer arm assembly TA for downward movement. Concurrently with this, the time-up signal "tp" is passed to the counter C$_o$ which thereupon counts a value +3 and, as a consequence, generates a count-up signal "Cp".

This count-up signal "Cp" is passed, via the OR-gate O$_1$, to the rotation stopper DS in order to stop reverse rotation of the drive motor M$_1$. The signal is also passed, as a work stop order, to the numerical control device NC in order to stop further operation of the transfer arm assembly TA. The signal is further passed to the alarm AL in order to generate some visible and/or audible alarm for opperators' attention. Namely, when the third chucking operation has ended in failure, the transfer arm assembly TA is locked against any further operations and waits for maintenance by the operators.

As described above, the chucking repeat controller according to this invention repeats chucking operation in the case of unsuccessful chucking and stops further operation of the tool transfer arm assembly when unsuccessful chucking repeats over prescribed times.

Figure 9:
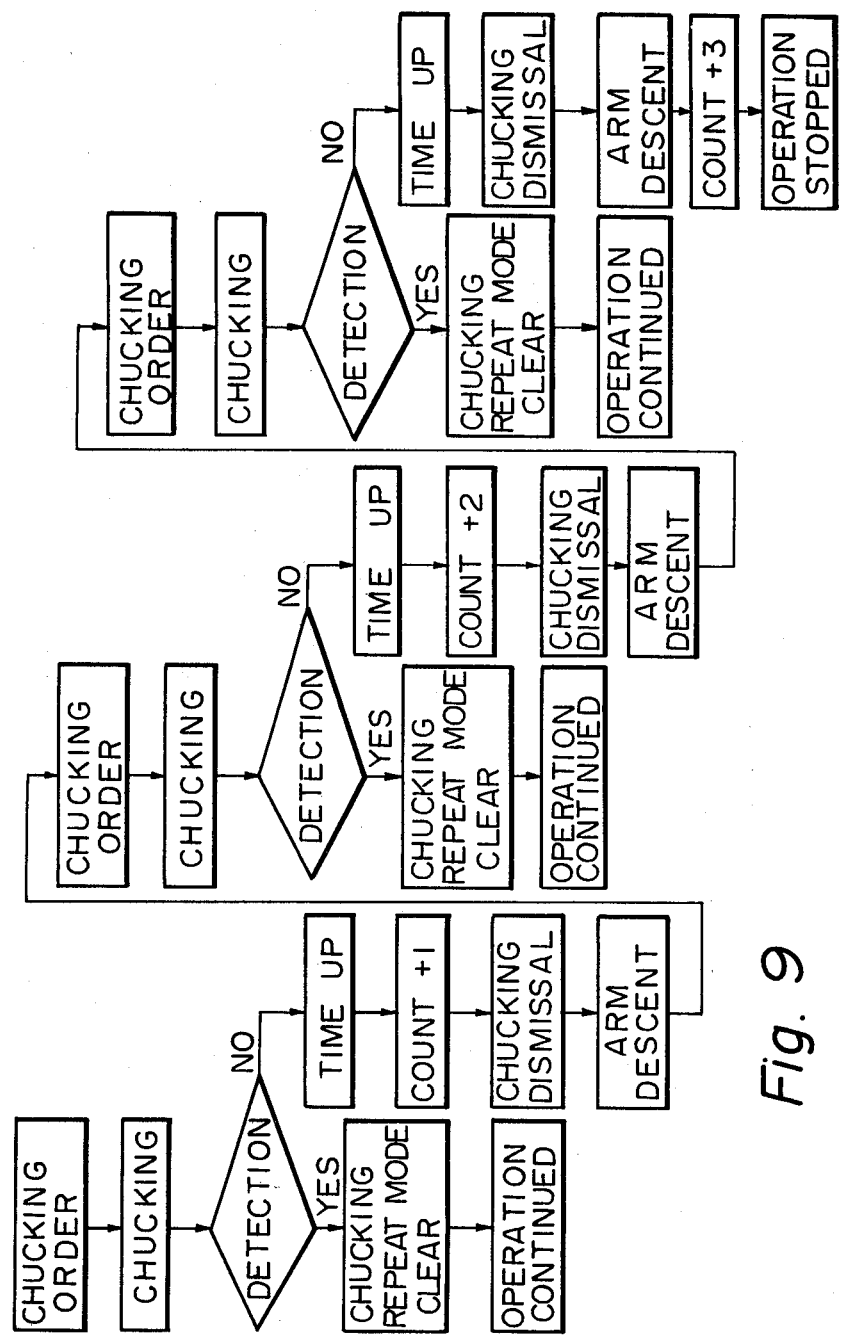
FIG. 9 is a flow chart for showing one example of the operation of the chucking repeat controller shown in FIG. 8.

The outline of its entire operation will hereinafter be explained in more detail in reference to FIG. 9.

When a chucking order is generated by the limit switch, the transfer arm assembly ascends and the drawing bolt drive motor is driven for normal rotation for the first chucking operation. As the chucking operation is over, success in operation is detected by the current sensor.

When the operation was successful (YES), chucking repeat mode is cleared up, and further operation of the transfer arm assembly is continued.

When the operation was unsuccessful (NO), a counter counts a value +1 with a prescribed time delay (for example 5 sec.), and the drive motor is driven for reverse rotation for chucking dismissal. The transfer arm assembly descends.

As the descent is complete, the limit switch again generates a chucking order, the transfer arm assembly ascends, and the drive motor is driven for normal rotation for the second chucking operation. As the chucking operation is over, success in operation is detected by the current sensor.

When the operation was successful (YES), chucking repeat mode (+1) is cleared up, and further operation of the transfer arm assembly is continued.

When the operation was unsuccessful (NO), the counter counts a value +2 with the prescribed time delay, and the drive motor is driven for reverse rotation for chucking dismissal. The transfer arm assembly descends.

As the descent is complete, the limit switch again generates a chuckling order, the transfer arm assembly ascends, and the drive motor is driven for normal rotation for the third chucking operation. As the chucking operation is over, success in operation is detected by the current sensor.

When the operation was successful (YES), chucking repeat mode (+2) is cleared up, and further operation of the transfer arm assembly is continued.

It is assumed in this instance that count-up of the counter takes place when the counter has counted three times of value +1. Then, when the operation was unsuccessful, the drive motor is driven for reverse rotation for chucking dismissal and the transfer arm assembly descends. Concurrently, the counter counts a value +3 and further operation of the transfer arm assembly is stopped, and an alarm is generated for operator's maintenance.

Figure 10:
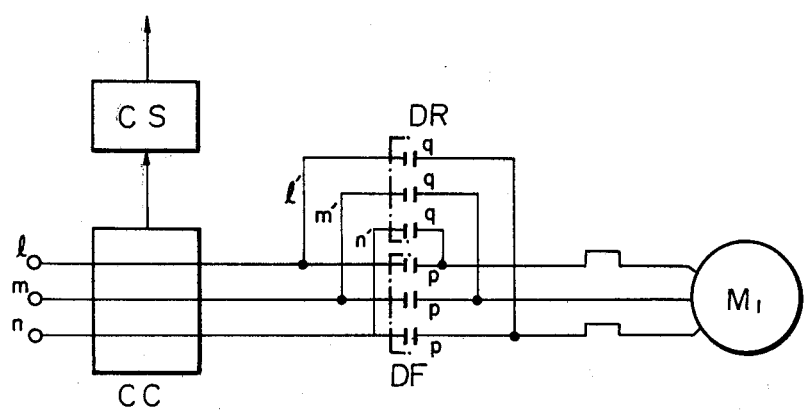
FIG. 10 is a circuit diagram of one example of the motor control circuit used for the chucking repeat controller shown in FIG. 8.

One example of the combination of the relays DF and DR in the motor control circuit MC is shown in FIG. 10. That is, contacts p of the normal rotation relay DF are connected to lines l, m and n whereas contacts q of the reverse rotation relay DR are connected to the lines l to n via branches l' to n' in such a manner that each contact q is connected to two different ones of the lines l to n. The overload current of the drawing bolt drive motor $M_1$ is picked up by a current converter CC and detected by the current sensor CS which generates the chucking complete signal j when the current detected exceeds a prescribed set value $I_3$.

Figure 11:
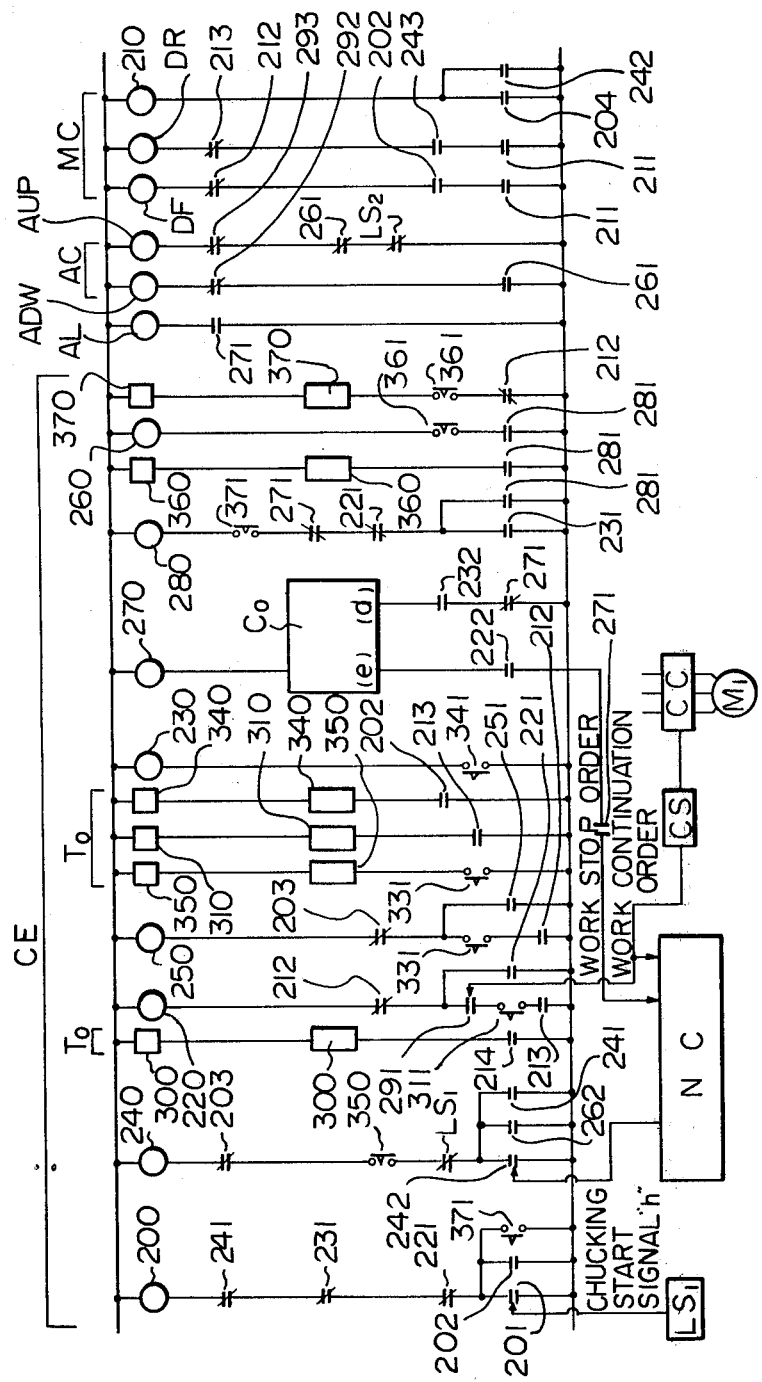
FIG. 11 is a detailed circuit diagram of one example of the chucking repeat controller shown in FIG. 8.

One specified example of the chucking repeat controller in FIG. 8 takes the form of a relay circuit shown in detail in FIG. 11. This relay circuit includes the chucking repeat circuit CE, the timer $T_o$, the counter $C_o$ which operates as a sort of chucking repeat fixer, the arm control circuit AC and the motor control circuit MC.

In more detail, the chucking repeat circuit CE includes a-chucking order relay 200 having two b-contact 201 and 203 and an a-contact 202, a chucking complete relay 220 having a b-contact 221 and an a-contact 222, a chucking stop relay 230 having a b-contact 231 and an a-contact 232, a release order relay 240 having a b-contact 241 and two a-contacts 242 and 243, a release complete relay 250 having a contact 251, a chucking repeat release order relay 260 having two a-contacts 261 and 262, an alarm relay 270 having an a-contact 271, a chucking repeat mode relay 280 having an a-contact 281, and an a-contact 291 which is closed due to the overload current $I_3$ (see FIG. 13) through the drive motor $M_1$.

The chucking repeat circuit CE further includes timers 310 and 330 to 370, in which the timers 310 and 330 to 350 forms a timer $T_o$ shown in FIG. 8.

The arm control circuit AC includes an alarm AL, an arm descent solenoid ADW with a b-contact 293, and an arm ascent solenoid AUP with a b-contact 292.

The motor control circuit MC includes the normal rotation relay DF, the reverse rotation relay DR, and a drive motor clutch relay 210 with an a-contact 211 which corresponds the rotation stopper DS shown in FIG. 8.

The relay circuit section for the chucking order relay 200 includes the b-contact 241 of the release order relay 240, the b-contact 231 of the chucking stop relay 230 and the b-contact 221 of the chucking complete relay 220 in a series connection. The circuit section further includes a contact 201 which is closed upon receipt of the chucking start signal "h" from the limit switch $LS_1$ at the check point position, the other contact 202 and a b-contact 371 of the timer 370 in a parallel connection. The series connection group is connected in series to the parallel connection group.

The relay circuit section for the chucking complete relay 220 includes the b-contact 212 of the reverse rotation relay DR, the contact 291, a contact 311 of the timer 310 and the b-contact 213 of the normal rotation relay DF in a series connection. The circuit section further includes the b-contact 221 of the chucking complete relay 220 in parallel to the last mentioned three series elements 291, 311 and 213.

The relay circuit section for the chucking stop relay 230 includes an a-contact 341 of the timer 340.

The relay circuit section for the release order relay 240 includes the b-contact 203 of the chucking order relay 200, the contact 351 of the timer 350 and the limit switch $LS_1$ at the check point position in a series connection. The circuit section further includes the a-contact 242 of the release order relay 240, the a-contact 262 of the chucking repeat release order relay 260, and the b-contact 241 of the release order relay 240 in a parallel connection. The resides connection group is connected in series to the parallel connection group.

The relay circuit section for the release complete relay 250 includes the b-contact 203 of the chucking order relay 200, an a-contact 331 of the timer 330 and the b-contact 212 of the reverse rotation relay DR. The circuit section further includes the contact 251 of the release complete relay 250 in parallel to the last mentioned two series elements 331 and 212.

The relay circuit section for the chucking repeat release order rely 260 includes the contact 361 of the timer 360 and the a-contact 281 of the chucking repeat mode relay 280 in a series connection.

The alarm relay 270 is connected to the counter $C_o$.

The input terminal (d) of the counter $C_o$ is connected in series to the a-contact 232 of the chucking stop relay 230 and the a-contact 271 of the alarm relay 270. The countup terminal (e) of the counter $C_o$ is connected, for supply of the work stop order, to the numerical control device NC via the a-contact 222 of the chucking complete relay 220 and the a-contact 271 of the alarm relay 270.

The relay circuit section for the chucking repeat mode relay 280 includes the b-contact 371 of the timer 370, the a-contact 271 of the alarm relay 270, the b-contact 221 of the chucking complete relay 220 and the b-contact 231 of the chucking stop relay 230 in a series connection. Further the a-contact 281 is connected in parallel to the b-contact 231.

The timer 310 is connected in series to the b-contact 213 of the normal rotation relay DF, the timer 330 is connected in series to the a-contact 214 of the reverse rotation relay DF, the timer 340 is connected in series to the a-contact 202 of the chucking order relay 200, the timer 350 is connected in series to the a-contact 331 of the timer 330, the timer 360 is connected in series to the a-contact 281 of the chucking repeat mode relay 280 and the timer 370 is connected in series to the contact 361 of the timer 360 and the b-contact 212 of the reverse rotation relay DR.

The alarm AL is connected in series to the a-contact 271 of the alarm relay 270.

The arm descent solenoid ADW is connected in series to the b-contact 292 of the arm ascent solenoid AUP and the a-contact 261 of the chucking repeat release order relay 260. The arm ascent solenoid AUP is connected to the b-contact 293 of the arm descent solenoid ADW, the a-contact 261 and a limit switch $LS_2$. This limit switch $LS_2$ is arranged in order to detect arrival of the tool transfer arm assembly TA at its uppermost position right above the check point position where the limit switch $LS_1$ is arranged.

The relay circuit section for the normal rotation relay DF includes the b-contact 212 of the reverse rotation relay DR, the a-contact 202 of the chucking order relay 200 and the a-contact 211 of the drive motor clutch relay 210 (rotation stopper DS).

The relay circuit section for the reverse rotation relay DR includes the b-contact 213 of the normal rotation relay DF, the a-contact 243 of the release order relay 240 and the a-contact 211 of the drive motor clutch relay 210.

The relay circuit section for the drive motor clutch relay 210 includes the a-contact 204 of the chucking order relay 200 and the a-contact 242 of the release order relay 240 connected in parallel to the a-contact 202.

It should be noted that some interlock connections are involved in the above-described construction of the relay circuit for the chucking repeat controller in order to ban concurrent activation of two related elements.

The first interlock connection is formed by the combination of the chucking order relay 200 accompanied by the contact 241 with the release order relay 240 accompanied by the b-contact 203. This interlock connection bans concurrent activation of the chucking order relay 200 and the release order relay 240.

The second interlock connection is formed by the combination of the normal rotation relay DF accompanied by the b-contact 212 with the reverse rotation relay DR accompanied by the b-contact 213. This interlock connection bans concurrent activation of the normal rotation relay DF and the reverse rotation relay DR.

The third interlock connection is formed by the combination of the arm descent solenoid ADW accompanied by the b-contact 292 with the arm ascent solenoid AUP accompanied by the b-contact 293. This interlock connection bans concurrent activation of the arm descent solenoid ADW and the arm ascent solenoid AUP.

The overall operation of the relay circuit shown in FIG. 11 is as follows. Here, it is assumed that the set time for the timer $T_o$ is 5 sec. and the counter $C_o$ counts up after receiving three seccessive time-up signals "tp".

The normal rotation relay DF drives, when activated, the drive motor $M_1$ for normal rotation in order to carry out the chucking operation. Closing of the contact 291 due to the overload current $I_3$ through the drive motor $M_1$ activates the chucking complete relay 220 so that a work continuation order should be passed to the numerical control device NC. Concurrently, the b-contact 221 is opened in order to in activate the chucking order relay 200 and reset the counter $C_o$.

Closing the a-contact 202 of the chucking order relay 200 activates the timer 340 which in turn closes its a-contact 341 in order to activate the chucking stop relay 230. Concurrently, the chucking order relay 200 is deactivated in order to induce inactivation of the drive motor clutch relay 210 and the normal rotation relay DF. Inactivation of the chucking stop relay 230 closes the b-contact 231 connected to the chucking order relay 200.

Closing of the a-contact 232 of the chucking stop relay 230 is counted by the counter $C_o$.

When the reverse rotation relay DR is activated, the a-contact 331 of the timer 330 is closed in order to activate the release complete relay 250. This release complete relay 250 is inactivated when the chucking order relay 200 is activated.

The release order relay 240 is activated by closing of the a-contact 242 due to the normal running release order generated by the numerical control device NC and operation of the a-contact 261 activated by the chucking repeat release order relay 260. Inactivation of the release order relay 240 is caused by OFF operation of the timer 350 and closing of the limit switch $LS_1$ upon arrival of the transfer arm assembly TA at the check point position. Closing of the limit switch $LS_1$ precedes the OFF operation of the timer 350.

Closing of the one a-contact 242 of the release order relay 240 activates the drive motor clutch relay 210 whereas the other contact 243 activates the reverse rotation relay DR.

As the drive motor $M_1$ start its reverse rotation due to activation of the release order relay 240 and the reverse rotation relay DR, closing of the a-contact 214 operates the timer 330. The a-contact 331 of the timer 330 is closed 0.5 to 1.0 sec. later in order to operate the next timer 350 and activate the release complete relay 250. The timer 350 immediately opens its contact 251 in order to inactivate the release order relay 240 and this inactivates the drive motor cluch relay 210, the reverse rotation relay DR and the release complete relay 250 in order to end the release operation.

The chucking complete relay 220 is activated when, under activated condition of the normal rotation relay DF, the a-contact 291 is closed by operation of the current convertor CC and the current sensor CS due to flow of the overload current through the drive motor $M_1$. This chucking complete relay 220 is operationally associated by the timer 310 operated by activation of the normal rotation relay DF so that same should not be erronously activated by the initial current section of the drive motor $M_1$.

Closing of the a-contact 232 caused by activation of the chucking stop relay 230 is counted by the counter $C_o$ and three times of successive counting activates the alarm relay 270 for selfholding. Closing of the a-contact 271 caused thereby activates the alarm AL, prevents activation of the chucking repeat mode relay 280, and passes the work stop order to the numerical control device NC for complete stop of the chucking operation.

The counter $C_o$ is reset when the a-contact 222 is closed by activation of the chucking complete relay 220 which is caused by closing of the a-contact 291 operated by the current convertor CC and the current sensor CS. At this moment, the b-contact 221 is kept open so that the chucking repeat mode relay 280 should not be activated. When any failure in chucking operation starts despite the normal rotation of the drive motor $M_1$, the a-contact 291 is left open. After the set time for the timer 340 is the chucking stop relay 230 activated in order to close its a-contact 232 and closing of this a-contact 232 operates the counter $C_o$ so as not to activate the alarm relay 270. The chucking repeat mode relay 280 is thereupon activated and its a-contact 281 is closed. Closing of the a-contact 281 activates the timer 360 and the chucking repeat release order relay 260, the timer 360 being for fixing of the descent time for the transfer arm assembly TA. This activation lasts for the set time of the timer 360. The a-contact 261 of the chucking repeat release order relay 260 is closed within the above-described set time and the arm descent solenoid ADW is activated in order to cause downward movement of the transfer arm assembly TA. At this moment, the arm ascent solenoid AUP is deactivated by operation of the b-contact 293 connected thereto.

Closing of the a-contact 262 of the chucking repeat release order relay 260 activates the release order relay 240 and the drive motor chuck relay 210 in order to drive motor $M_1$ for the reverse rotation. This rotation time is fixed by the timers 330 and 350. That is, the timer 350 inactivates the release order relay 240 to stop the reverse rotation of the drive motor $M_1$ and closing of the b-contact 212 of the reverse rotation relay DR activates the timer 370. After the set time of the time 370, the b-contact 371 is closed in order to activate the chucking order relay 200. The drive motor clutch relay 210 and the normal rotation relay DF are also activated thereby for normal rotation of the drive motor $M_1$. Before this moment, the chucking repeat release order relay 260 is inactivated after the set time for the timer 360 and the b-contact 293 of the arm descent solenoid ADW is closed. As a consequence, the arm ascent solenoid AUP is activated in order to cause the upward movement of the transfer arm assembly TA.

Figure 12:
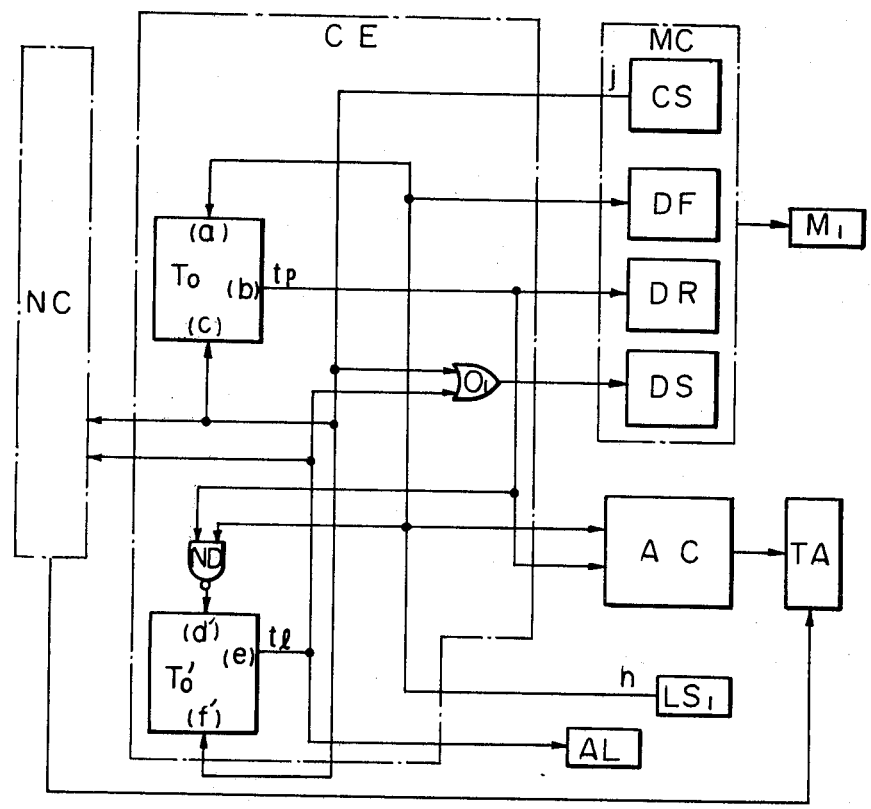
FIG. 12 is a block diagram of another embodiment of the chucking repeat controller in accordance with the present invention.

Another embodiment of the chucking repeat controller in accordance with the present invention is shown in FIG. 12, in which a different type of chucking repeat fixer is used for repeating the chucking operation in case of unsuccessful chucking. That is, as a substitute for the counter $C_o$ used for the preceding embodiment, a time-limit timer $T_o'$ is used for this embodiment.

More specifically, the input terminal (d') of the time-limit timer $T_o'$ is connected, via a NAND-gate ND, to the limit switch $LS_1$ and the time-up terminal (b) of the timer $T_o$ so that the time-limit timer $T_o'$ should be activated only when a chucking start signal "h" from the limit switch $LS_1$ is received without input of any time-up signal "tp" from the timer $T_o$. The reset terminal (f') of the time-limit timer $T_o'$ is connected to the current sensor CS in the motor control circuit MC so that the time-limit timer $T_o'$ should clear up its chucking repeat mode upon receipt of a chucking complete signal "j" which indicates success in the chucking operation. The time-limit terminal (e') of the time-limit timer $T_o'$ is connected to the alarm AL, to the rotation stopper DS via the OR-gate $O_1$, and to the numerical control device NC.

A delay time is set for the time-limit timer $T_o'$ so that the time-limit timer $T_o'$ should generate, at its time-limit terminal (e'), a time-limit signal "$t_1$" after such a delay time. When the overall operation of the transfer arm assembly TA should be stopped after N times of successive failures in chucking operation, the delay time should be N times as long as the unit time for one cycle of chucking operation. Thus, when the overall operation of the transfer arm assembly TA should be stopped after 3 times of successive failures in chucking operation and the unit time for one cycle of chucking operation is 6 to 7 sec., the delay time is about 21 sec. from the initial activation by the first chucking start signal "h".

The time-limit signal "$t_1$" is passed to the alarm AL for operators' attention, to the rotation stopper DS in order to stop the drive motor $M_1$, and to the numerical control device NC as a work stop order.

On the assumption that 3 times of successive failure in chucking operation should cause stoppage of the overall operation of the transfer arm assembly TA, the first chucking start signal "h" from the limit switch $LS_1$ activates the time-limit timer $T_o'$. When the first chucking operation has ended in failure, the first time-up signal "$t_p$" is generated by the timer $T_o$ and, subsequently, the second chucking start signal "h" is generated by the limit switch $LS_1$. They, however, has no influence on the operation, i.e. the time counting, of the time-limit timer $T_o'$ due to presence of the NAND-gate ND. No chucking complete signal "j" comes from the current sensor CS and the time-limit timer $T_o'$ continues its time counting. When the second chucking operation has ended in failure, the second time-up signal "$t_p$" is generated by the timer $T_o$ and, subsequently, the third chucking start signal "h" is generated by the limit switch $LS_1$. They also have no influence on the time counting of the time-limit timer $T_o'$. No chucking complete signal "j" comes from the current sensor CS and the time-limit timer $T_o'$ continues its time counting. When the third chucking operation has ended in failure, the delay time is overdue and the time-limit timer $T_o'$ generates, at its time-limit terminal (e'), a time-limit signal "$t_1$". This is passed to the alarm AL in order to catch operators' attention, to the rotation stopper DS in order to stop the drive motor $M_1$, and to the numerical control device NC in order to stop further operation of the transfer arm assembly TA. When any chucking operation has ended in success, the current sensor CS generates a chucking complete signal "j" which clears up the chucking repeat mode in the time-limit timer $T_o'$.

Figure 13:
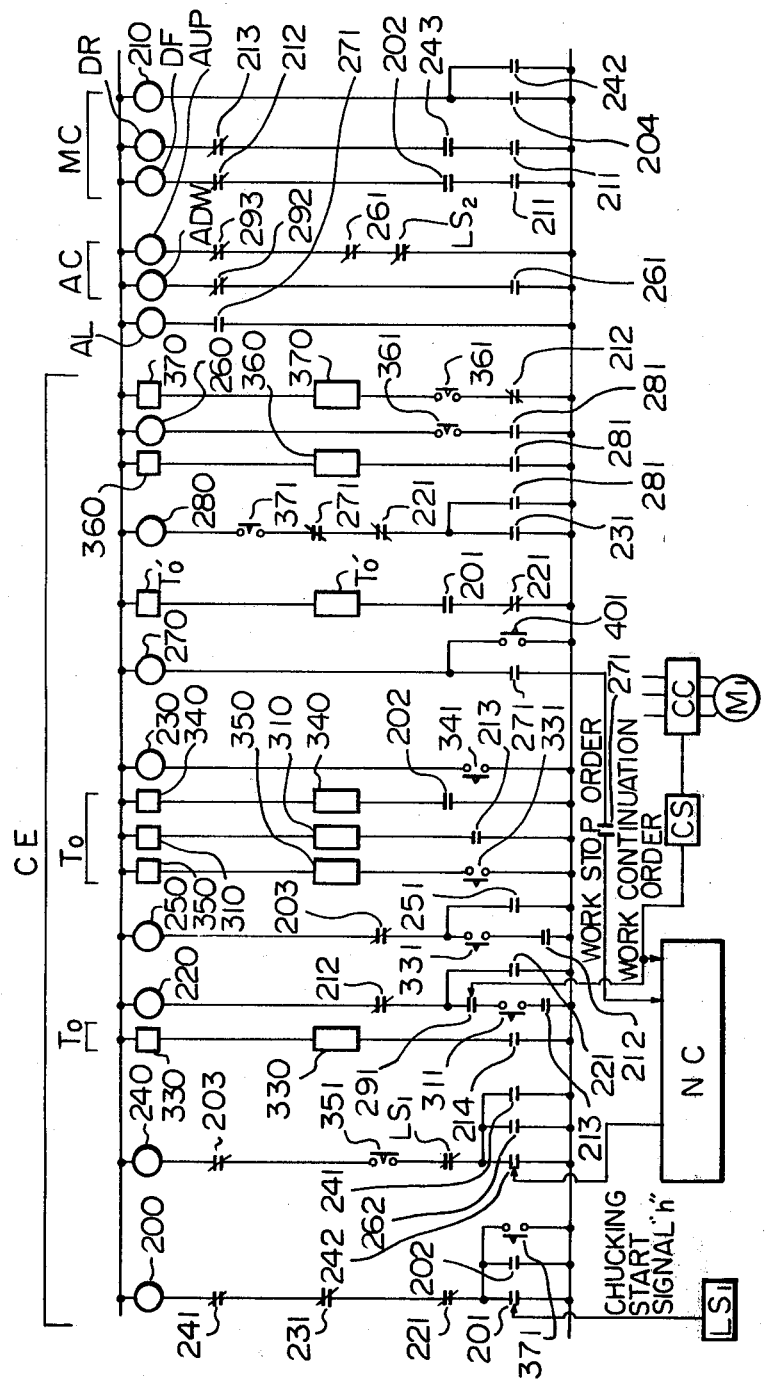
FIG. 13 is a detailed circuit diagram of one example of the chucking repeat controller shown in FIG. 12.

The chucking repeat controller shown in FIG. 12 may be given in the form of a relay circuit such as shown in FIG. 13 which is basically same in construction as that in FIG. 11 except for the point that the counter $C_o$ is replaced by the time-limit timer $T_o'$. More specifically, the relay circuit section for the alarm relay 270 includes an a-contact 401 of the time-limit timer $T_o'$ connected in parallel to its own a-contact 271. The time-limit timer $T_o'$ is connected, in series, to the contact 201 of the chucking order relay 200 and to the b-contact 221 of the chucking complete relay 220.

Closing of the a-contact 201 activates the time-limit $T_o'$ whereas opening of the b-contact 221 inactivates the time-limit timer $T_o'$. When chucking operation is repeated even after the delay time and the chucking complete relay 220 isn't activated, the a-contact 401 of the time-limit timer $T_o'$ is closed in order to activate the alarm relay 270. Thereupon, a work stop order is passed to the numerical control device NC and the chucking repeat mode relay 280 is inactivated in order to ban further operation.

The operation of the work machine provided with the chucking repeat controller in accordance with the present invention will now be explained in sequence in reference to the time chart shown in FIG. 14 whilst citing the embodiment shown in FIG. 8 wherein a counter $C_o$ is used as a chucking repeat fixer.

The process start with the condition under which, as shown in FIGS. 1 and 2, the shank 11 of a new tool holder $T_1$ held by the transfer assembly TA is going to be inserted into the conical recess 7a of the main spindle 7. This condition is detected by the current sensor CS of the motor control circuit MC, which thereupon passes a chucking complete signal "j" to the chucking repeat circuit CE in order to clear up, i.e. reset, the counter $C_o$. Simultaneously with this, the timer $T_o$ with a set time of 5 sec. is activated and starts its time counting. The chucking repeat circuit CE passes a chucking order to the motor control circuit MC and the normal rotation relay DF is activated in order to initiate normal rotation of the drive motor $M_1$. The chucking repeat circuit CE further passes an ascent order to the arm control circuit AC in order to initiate upward movement of the transfer arm assembly TA.

As a consequence, the screw 11a on the top of the tool holder $T_1$ comes into screw engagement with the screw 8a on the drawing bolt 8 driven for normal rotation as shown in FIG. 3. As the screw engagement is complete, the shank 11 of the tool holder $T_1$ is chucked and clamped in the conical recess 7a of the main spindle 7 as shown in FIG. 4.

Then, the overload current flows through the drive motor $M_1$. The process from rotation start of the drive motor $M_1$ to the flow of the overload current is shown graphically in FIG. 14. At the rotation start, high initial current $I_1$ flows through the drive motor $M_1$ and lower constant current $I_2$ flows through the drive motor $M_1$ during the chucking operation. From the timing $t_1$ whereat the chucking operation is complete, the drive motor $MM_1$ ceases its normal rotation and overload current $I_o$ starts flow. At a timing $t_2$, the overload current $I_o$ exceeds the current $I_3$ set for the current sensor CS. Then, before a timing $t_3$, which is equal to 5 sec. in the outstanding example, the current sensor CS generates the chucking complete signal "j" in order to clear up, i.e. reset, the timer $T_o$ and the counter $C_o$. The chucking complete signal "j" is passed, as a stop order, to the motor control circuit MC in order to inactivate the normal rotation relay DF and stop the normal rotation of the drive motor $M_1$. The chucking complete signal "j" is further passed, as a work continuation order, to the numerical control device NC in order to open the holder jaws 113 and 114 of the transfer arm assembly TA and drive the main spindle 7 for rotation.

When chucking operation has ended in failure, the chucking repeat controller in accordance with the present invention operates as follows. When the level of the constant current $I_2$ during the chucking operation is maintained even after the timing $t_2$, the tool holder $T_1$ continues its rotation with the drawing bolt 8 and the timer $T_o$ generates a time-up signal "$t_p$" at the timing $t_3$ which passed, as a release order, to the motor control circuit MC in order to activate the reverse rotation relay DR and the drive motor $M_1$ with the drawing bolt 8 is driven for reverse rotation over a period $t_4$. Concurrently, the time-up signal "$t_p$" is passed, as a descent order, to the arm control circuit AC in order to cause downward movement of the transfer arm assembly TA holding the tool $T_1$. The time-up signal "$t_p$" is further passed to the counter $C_o$ which thereupon counts $+1$. As a consequence, the screw 11a on the shank 11 is disengaged from the screw 8a on the drawing bolt 8 and the transfer arm assembly TA operates on the limit switch $LS_1$ upon arrival at the check point position right below the main spindle 7.

Figure 14:
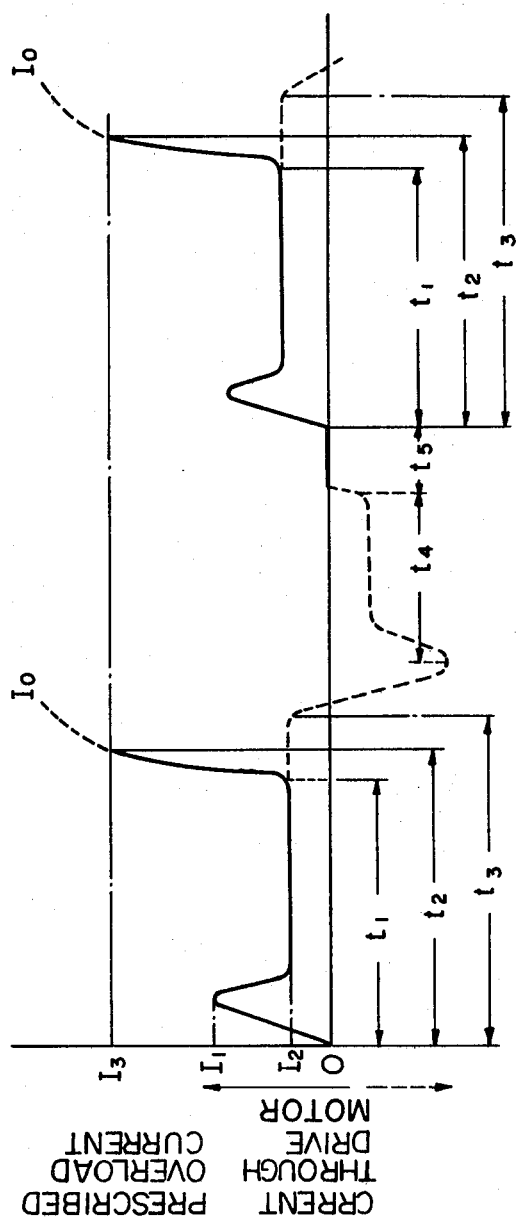
FIG. 14 is a time chart for showing the operation of the chucking repeat controller in accordance with the present invention.

During this period, the current through the drive motor $M_1$ varies as shown with a dot-line curve in FIG. 14. That is, the drive motor $M_1$ is driven for reverse rotation due to activation of the reverse rotation relay DR and this initial current flows in the opposite direction as shown with the dot-line. The current thereafter assumes the level of a constant current. At the timing $t_4$, the limit switch $LS_1$ is operated and the reverse rotation relay DR of the motor control circuit MC is inactivated upon receipt of the time-up signal "$t_p$" from the timer $T_o$. The current through the drive motor $M_1$ falls to zero for a period of $t_5$. As the limit switch $LS_1$ is operated, the motor control circuit MC activates the normal rotation relay DF in order to initiate normal rotation of the drive motor $M_1$, the timer $T_o$ starts its time counting, and the arm control circuit AC drives the transfer arm assembly TA for upward movement. Then, screw engagement starts between the screw 11a on the shank 11 and the screw 8a on the drawing bolt 8.

When the screw engagement is complete and the overload current flow through the drive motor $M_1$ as shown in FIG. 4, the current sensor CS generates a chucking complete signal "j" as the overload current exceeds the level $I_3$ for the current sensor CS. The chucking complete signal "j" is passed, as a stop order, to the motor control circuit MC in order to stop rotation of the drive motor $M_1$, and resets the timer $T_o$ and the counter $C_o$. Further, the chucking complete signal "j" is passed, as a work continuation order, to the numerical control device NC. The current through the drive motor $M_1$ varies during the above-described process shown in the right half of FIG. 14 just as in the first cycle chucking operation.

When the screw engagement between the screws 11a and 8a has again ended in failure and the timing $t_3$ is overdue, the timer $T_o$ generates a time-up signal "$t_p$" which activates the reverse rotation relay DR in the motor control circuit MC in order to initiate reverse rotation of the drive motor $M_1$. The arm control circuit AC is also activated by this time-up signal "$t_p$" and causes descent of the transfer arm assembly TA. The counter $C_o$ counts one more $+1$. This causes disengagement of the tool holder $T_1$ from the drawing bolt 8 and the limit switch $LS_1$ is again operated by the transfer arm assembly TA now arriving at the check point position right below the main spindle 7. Then, the limit switch $LS_1$ generates a chucking start signal "h" which makes the timer $T_o$ start its time counting, the transfer arm assembly TA is driven for upward movement, and the motor control circuit MC initiates normal rotation of the drive motor $M_1$. As a result, the third chucking operation starts.

When no chucking complete signal is generated by the current sensor CS within the time-up time of the timer $T_o$, a further time-up signal "$t_p$" is generated by the timer $T_o$ and the counter $C_o$ counts a further $+1$ in order to generate a count-up signal "$C_p$". This count-up signal "$C_p$" activates the alarm Al for operators' attention, is passed to the motor control circuit MC in order to stop rotation of the drive motor $M_1$, and is passed to the numerical control device NC as a work stop order. Thereupon, the transfer arm assembly TA ceases its entire motion whilst keeping the tool holder $T_1$ in the state inserted into the main spindle 7 as shown in FIG. 3.

As is clear from the foregoing, chucking operation is repeated for prescribed times upon detection of any unsuccessful chucking operation and, when failure in chucking operation exceeds the prescribed times, the chucking operation and the operation of the numerical control device are both automatically stopped for proper maintenance of the system. This effectively prevents accidental falling of the tool and its holder from the main spindle due to unsuccessful chucking operation, and enables early finding of wear in the screw construction to the tool holder.

I claim:

1. A chucking repeat controller used for a work machine having a main spindle adapted for chucking a tool, a drive motor for said main spindle, a transfer arm assembly for replacing one tool on said main spindle with another tool reserved at a given stand-by position by its horizontal turning and vertical reciprocation, and a numerical control device for controlling operation of said transfer arm assembly according to a given programme, comprising:

a limit switch arranged at a check point position right below said main spindle and generative of a chucking start signal every time said transfer arm assembly arrives at said check point position, a motor control circuit connected to said drive motor and including a current sensor which is attached to said drive motor and generative of a chucking complete signal upon defection of success in each chucking operation by said main spindle, an arm control circuit connected to said transfer arm assembly in order to control movement thereof between said main spindle and said check point position, and a chucking repeat circuit connected to said numerical control device, said limit switch, said motor control circuit and said arm control circuit, and including a timer and a chucking repeat fixer connected to said timer;

said timer and said chucking repeaat fixer clearing up the chucking repeat mode of said chucking repeat circuit, and said motor control circuit stopping rotation of said drive motor, both upon receipt of said chucking complete signal from said current sensor which is concurrent by passed to said numerical control device as a work continuation order in order to enable subsequent operation of said transfer arm assembly as programmed, said timer generating, when no chucking complete signal is received from said current sensor within a prescribed set time after receipt of said chucking start signal from said limit switch, a time-up signal which is passed to said motor control circuit as a reverse rotation order for said drive motor, and to said arm control circuit as a descent order for said transfer arm assembly, and said chucking repeat fixer further generating, when chucking operation by said main spindle has ended in failure for prescribed times in succession, an interception signal which is passed to said motor control circuit as a stop order to said drive motor, and to said numerical control device as a work stop order to ban said subsequent operation of said transfer arm assembly as programmed.

2. A chucking repeat controller as claimed in claim 1 further comprising an alarm connected to said chucking repeat fixer of said chucking repeat circuit and generative of a visible and/or audible alarm for operators' attention upon receipt of said interception signal.

3. A chucking repeat controller as claimed in claim 1 or 2 in which said timer has an input terminal connected to said limit switch, a reset terminal connected to said current sensor of said motor control circuit, and a time-up terminal generative of said time-up signal, and said chucking repeat fixer is a counter which has an input terminal connected to said time-up terminal of said timer, a reset terminal connected to said current sensor of said motor control circuit, and a count-up terminal generative of said interception signal in the form of a count-up signal when prescribed number of said time-up signals have been received in succession from said timer.

4. A chucking repeat controller as claimed in claim 1 or 2 in which said timer has an input terminal connected to said limit switch, a reset terminal connected to said current sensor of said motor control circuit, and a time-up terminal generative of said time-up signal, said chucking repeat fixer is a time-limit timer which has an input terminal connected to said time-up terminal of said timer and said limit switch via a NAND-gate, a reset terminal connected to said current sensor of said motor control circuit, and a time-limit terminal generative of said interception signal in the form of a time-limit signal after a prescribed delay time from its activation, said delay time being N-times as long as the unit time for one cycle of chucking operation whilst N being a positive integer.

* * * * *